United States Patent [19]

Woell

[11] 4,393,969
[45] Jul. 19, 1983

[54] ROLLER TABLE FOR USE WITH A POWER SAW

[76] Inventor: William J. Woell, R.R. 1, Davenport, N. Dak. 58021

[21] Appl. No.: 200,777

[22] Filed: Oct. 27, 1980

[51] Int. Cl.³ .............................................. B65G 13/00
[52] U.S. Cl. ............................... 193/35 TE; 83/471.3; 193/37
[58] Field of Search .............. 193/35 R, 35 F, 35 TE, 193/35 J, 37; 29/110 R; 83/471.3, 471.2, 486

[56] References Cited

U.S. PATENT DOCUMENTS

| | | | |
|---|---|---|---|
| 1,438,544 | 12/1922 | Miller . | |
| 2,528,116 | 7/1946 | Clemson | 56/249 |
| 2,555,217 | 6/1948 | Yong | 143/132 |
| 2,722,243 | 5/1954 | Nagy | 143/132 |
| 2,760,617 | 8/1956 | Bowen | 193/35 TE |
| 3,793,689 | 2/1974 | Specht | 29/116 R |
| 3,919,754 | 11/1975 | Sorresso | 29/120 |
| 4,068,551 | 1/1978 | Kreitz | 83/471.3 |
| 4,068,561 | 1/1978 | Kreitz | 83/471.3 |
| 4,213,523 | 7/1980 | Frost et al. | 193/37 |

Primary Examiner—John J. Love
Assistant Examiner—Gene A. Church
Attorney, Agent, or Firm—Kinney, Lange, Braddock, Westman & Fairbairn

[57] ABSTRACT

A self supporting roller table in combination with a power saw includes a frame with polygonal sides and a plurality of support legs supporting the frame independently of the power saw at a height compatible for cooperation with the power saw. A plurality of parallel rollers are each rotatably attached within and to the frame. Each roller is made from a conventional plastic pipe section with a pair of plastic end plugs having integrally molded stub shafts for rotatably mounting the rollers.

6 Claims, 6 Drawing Figures

ROLLER TABLE FOR USE WITH A POWER SAW

BACKGROUND OF THE INVENTION

1. Field of the Invention

The present invention relates to work supporting tables with rollers for use with woodworking equipment.

2. Prior Art

In the prior art, the Kreitz U.S. Pat. No. 4,068,551 shows a work table attached to a radial arm saw. The table is pivoted at one end of the saw table and has a pair of support legs at the other end. The work table is not self supporting and thus cannot be moved away from the power saw when the need arises. The worktable is pivoted downwardly for storage along the saw and thus the length of the worktable is limited. Further the "swept" space through which the worktable pivots cannot be used for storage.

Nagy U.S. Pat. No. 2,722,243 shows a worktable extension attached to the power saw with two vertical supports supporting an outwardly extending horizontal frame. The horizontal frame has a pair of rollers 36,37. However, the vertical support 23,24 extends above the horizontal frame and the rollers, thereby limiting the width of the workpiece that can be moved along the worktable extension and also interfering with workpiece movement.

Young U.S. Pat. No. 2,555,217 shows a saw table extension attached to a saw table rail 8 and having support legs at its distal end. The extension also has rollers 13. The use of the saw table extension, however, is limited to saw tables having rails along an edge, as shown in FIG. 1 and the roller spacing is so great that boards can easily flex and pass between the rollers, which makes operation difficult.

Rollers on a work table that is used adjacently to a power saw help in moving the workpiece in a smooth, non-marring manner. The ease of moving the workpiece along the work table of the power saw is important for precise cutting of the workpiece. Workpieces used to make fine furniture and cabinetry require a surface that allows the workpiece to be moved without marring. In addition, safety is enhanced by providing a table that allows a steady and uniform feed of the workpiece into the power saw.

The Miller U.S. Pat. No. 1,438,544 shows an aluminum rolling pin. A metal roller is not desirable in a wood-working operation since the metal may mar the surface of the workpiece, which is of great importance in the making of fine furniture and cabinets. The Specth U.S. Pat. No. 3,793,869 shows a plastic roller device rotatably engaging a shaft with bearings. The use of bearings increases significantly the cost of a roller, and thus increases the cost of a work table significantly since a number of rollers would be required to move the workpiece smoothly along the table.

The Clemson U.S. Pat. No. 2,528,116 shows a roller construction for use with a lawn mower. The rollers are made of a plurality of molded plastic sections. The Sorresso U.S. Pat. No. 3,919,754 shows a tubular roller construction having end caps 12 with a bearing 20 coaxially located in shoulder 18, as shown in FIG. 3. Again, the bearing increases the cost of a roller significantly and the cost of the work table especially where a number of such rollers are to be used.

SUMMARY OF THE INVENTION

The present invention includes a self-supporting roller top table for use with a power saw or other tool. The roller table has a frame with a plurality of support legs supporting the frame independently of the power saw or tool at a height compatible for moving workpieces from the roller table to the tool. The roller table includes a plurality of parallel rollers where each roller is rotatably attached within said frame. Each roller is constructed from a conventional plastic pipe section with a pair of plastic end plugs concentrically engaging both ends of the plastic pipe section. The plastic end plugs have coaxial stub shafts for rotatably mounting the rollers to the frame of the roller table.

The plastic rollers used in the roller table will not mar the surfaces of the workpieces moved on the table. Moreover, each roller is made of a conventional plastic plumbing pipe to reduce the cost substantially. The plastic end plugs need no bearings. The plastic material has low friction properties and needs no further bearing material. With the cost of roller construction being reduced significantly, the cost of a table having a plurality of such rollers is substantially reduced. The table has folding legs which permit the table to be stored in a limited space and the legs are individually adjustable for leveling the table. The frame length is sufficient to support eight foot pieces of material after a cut is completed.

DETAILED DESCRIPTION OF THE PREFERRED EMBODIMENT

Figure 1:
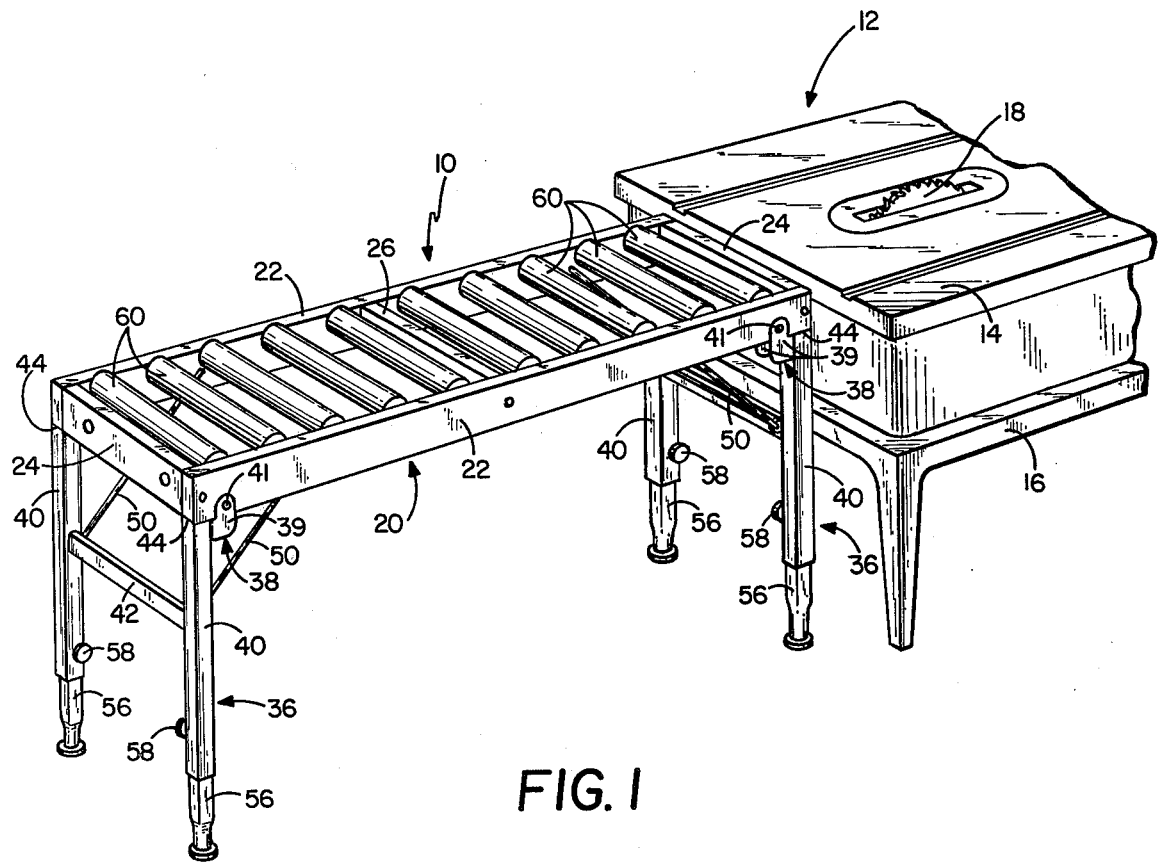
FIG. 1 is a perspective view of the self-supporting roller table in working position adjacent to a power saw.

A self supporting roller table generally indicated at 10 is shown in FIG. 1 being used in combination with a power saw 12. The power saw 12 has a working table top 14 supported by a frame 16 with a power driven saw blade 18 used for cutting wood. A conventional table saw is shown in FIG. 1; however, a radial arm saw or any other configuration of power tool having an elevated working table 14 is contemplated.

The roller table 10 has a frame 20 of rectangular configuration including longitudinal side members 22 connected by cross members 24. A midsection cross member 26 preferably connects the longitudinal side members proximate their midsection to further stabilize and strengthen the frame 20.

Figure 3:
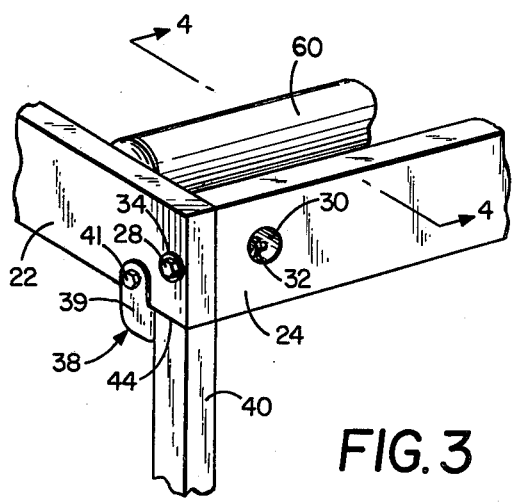
FIG. 3 is an enlarged fragmentary perspective view showing the construction of a corner of the frame of the roller table.

The longitudinal side members 22 and cross members 24,26 are connected together as shown in FIG. 3. A bolt 28 extends through each longitudinal side member 22 proximate each end into a provided hole in the adjacently abuted end of the cross member 24. The bolt extends to an aperture 30 exposing the threaded end of bolt 28. The aperture 30 allows nut 32 to be threaded on the end of bolt 28, thereby securing the longitudinal side member 22 to the cross member 24. A washer 34 may be placed between the head of the bolt 28 and the longitudinal side member 22. The longitudinal side members 22 and the cross members 24,26 are preferably made of wood.

Figure 2:
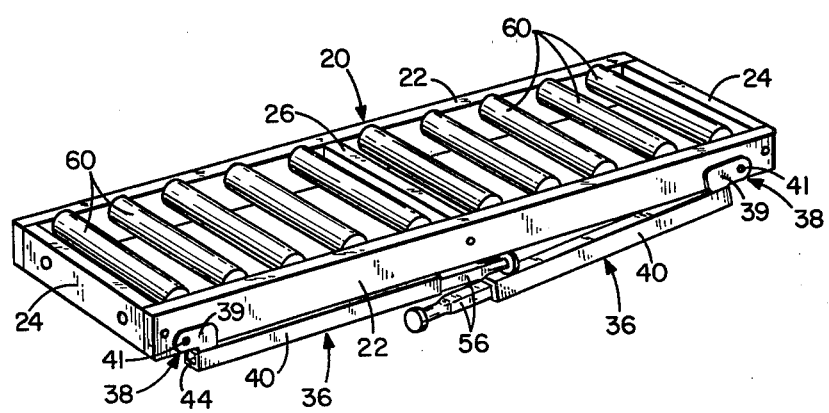
FIG. 2 is a perspective view of the self-supporting roller table in a folded position.

The roller table 10 preferably has a support leg assembly comprising a pair of legs at each end. The leg assemblies are pivotally mounted to the frame 20 by hinges 38, as shown in FIGS. 1, 2 and 3. The pivotal hinge 38 has a pair of ears 39, one on each side of the longitudinal side members 22 and pivotally connected thereto by a connecting bolt 41 extending through both ears. The pivotal hinge 38 is rigidly attached, preferably welded, to the upper portion of each leg 40. The upper leg portions of each pair of support legs are connected together by cross beam 42. The ends 44 of the upper leg portions 40 abut against the underside of the frame 20 when support leg assemblies 36 are in an upright working position. Thus, the underside of the horizontal frame 20 provides an upper stop for the pivoting support leg assemblies 36. In the folded position, as shown in FIG. 2, the support leg assemblies 36 are pivoted upwardly to rest against the underside of the frame 20. The ears 39 provide a hinge axis offset from the ends of the legs to which they are attached in two directions to permit the ends 44 of the legs to abut the lower edge of the side frame members when in stopped, working position.

Figure 4:
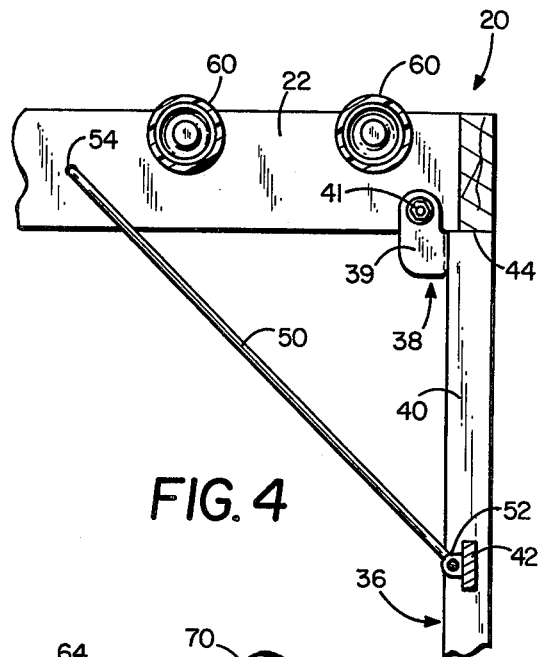
FIG. 4 is a cross sectional view taken along the lines 4—4 in FIG. 3.

Braces 50 preferably hold support leg assemblies 36 in an upright position. The braces 50 are a substantially U-shaped rod member pivotedly connected by a pair of brackets 52 attached to each cross beam 42, as shown in FIG. 4. The two free ends of each brace 50 engage apertures 54 on oppositely facing inside surfaces of the longitudinal side members 22, holding the end 44 of the upper leg portion 40 against the underside of the frame 20.

Support leg assemblies 36 have adjustable bottom leg portions 56, preferably made of wood, which telescope into upper leg portions 40. Each bottom portion 56 is held in a fixed position relative to the upper leg portion by thumb screws 58, as best seen in FIG. 2, threaded into upper support legs 40 to bear against and hold the lower leg portions 56 in a fixed vertical position. The lower leg portions 56 are also used to adjust the height of the roller table to correspond to the height of the work table top 14 of the power saw 12 or other tool.

Figure 5:
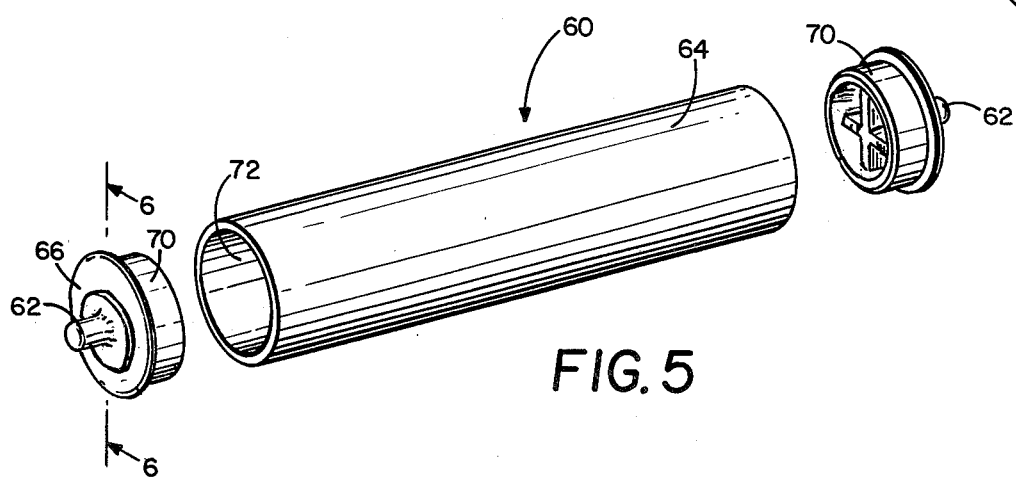
FIG. 5 is an exploded perspective view showing the construction of a roller of the roller table.

A plurality of rollers 60 are rotatably mounted to the frame 20 on the longitudinal side members 22, as shown in FIGS. 1 and 2. All the rollers 60 have rotatable axes which are in a general parallel relationship. The rollers are mounted with stub shafts 62 as shown in FIG. 5, which engages corresponding bores (not shown) on the inside surfaces of the longitudinal side members 22. The bores do not extend through the longitudinal side members 22.

Figure 6:
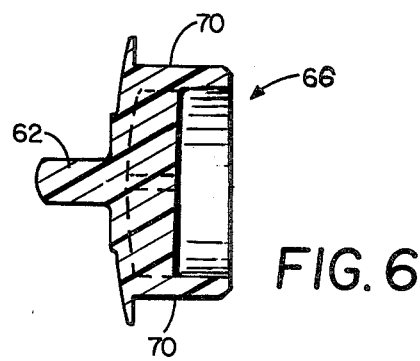
FIG. 6 is a cross sectional view of the plastic end plugs taken along the line 6—6 in FIG. 5.

The roller 60 includes a main cylindrical body 64 and a pair of plastic end plugs 66 which have the stub shafts 62 molded thereon. The main roller body 64 is made from semi-rigid conventional plastic drain pipe. In one working model of the present invention, the main body 64 was made of an ABS schedule 40 drain pipe. The plastic end caps 66 have outer cylindrical surfaces 70, as shown in FIG. 6 which engage the inside surface 72 of the main roller body 64 with a press fit. The surfaces 70 frictionally engage the inside surfaces 72 of the main body 64 and are held concentric with the outer roller surface without the use of separate fasteners. When plastic end caps 66 are pressed into both ends of main roller body 60 the stub shafts 62 protrude from the opposite ends of the roller. The roller 60 rotates on shafts 62 in the wood side members without any additional bearings.

The stub shafts may be reinforced with suitable gussets as necessary. Also, the end caps 66 each have an annular flange to provide a stop surface which properly locates the caps as they are pressed into the pipe sections. When the flanges are seated on the end surfaces of the pipe section the caps are properly located.

Plastic roller 60, made of conventional plastic piping, has an outer surface which does not mar wood, as the metal rollers of the prior art did. Also, the plastic rollers are much lighter-weight. The workpieces can be moved along the rollers to the table saw 12 without the risk of marring the workpiece surface. The roller eliminates the the need for bearings or lubrication and the main body 64 is made of inexpensive non-corrosive conventional plastic piping to lower the cost of a roller substantially. The plastic rollers will not harm cutting tools and can be replaced if damaged using standard drain pipe. The result is that many more rollers can be used to produce an affordable work table.

In one preferred embodiment, ten plastic rollers of standard two inch ID pipe spaced about 6 inches on center were used to form a work table. The overall length is above five feet. This space between rollers provides several lines of contact with a workpiece as it moves along the roller table to the work table 14 of the power tool. The space between rollers (about 4 inches gap) is small enough so that boards will not bend or flex to pass from the top of one roller and under the adjacent roller; yet tools will not fall between the rollers so they will not be in the way or scratch the workpiece.

The frame length of the roller table (about five feet overall) is sufficient to support a standard eight foot length of plywood without having it unbalanced. The frame is free standing, can be quickly adjusted in height or level and when collapsed for storage it does not take valuable floor space. It is easily portable because of its light weight.

Although the present invention has been described with reference to preferred embodiments, persons skilled in the art will recognize that changes may be made in form and detail without departing from the spirit and scope of the invention.

What is claimed is:

1. For use in combination with a power tool with which large workpieces are used, a self-supporting roller table comprising:

a frame comprising a pair of spaced, parallel, side members and end members joining the side members;

a plurality of support legs at each end of the frame for supporting said frame independently of the power tool at a height compatible for cooperation with said power tool, said legs comprising a pair of leg assemblies at each end of the frame, each leg assembly comprising a pair of legs, each leg comprising a tube section joined to another tube to move as an assembly and having upper and lower ends, said legs each including an adjustable leg portion adjustably telescopically fitted in each tube section;

a plurality of rollers, each roller comprising a plastic pipe section having two open ends and a pair of plastic end plugs having surfaces for respectively concentrically engaging an inside surface of the plastic pipe at both open ends and an integrally molded plastic stub shaft, each side member of the frame having a plurality of apertures formed therein and having annular surfaces for directly receiving the stub shafts of the end plugs to rotatably mount the stub shafts and said rollers in generally parallel spaced apart relationship and directly supported on the annular surfaces; and hinge means for pivotally mounting the leg assemblies to the frame side members to position the tubes of each assembly below the lower edge of a respective side member and in alignment therewith, the hinge axis of the hinge means being offset from the longitudinal axis of the legs and above the upper ends of the legs so that when the legs are pivoted upright the upper ends of the tube sections of the legs abut against the lower edge of the respective side frame member to directly support the frame and rollers.

2. The table of claim 1 and brace means from each pair of legs extending to the frame side member, said brace means comprising rods having end portions at right angles to the main portions of the brace means, and a separate aperture on the interior surface of each frame side member of size to removably retain the end portion of each rod when the legs are in upright position.

3. The table of claim 1 wherein the offset of the hinge axis of the hinge means permits the legs to fold substantially against the lower surface of the respective frame side member.

4. The table of claim 1 wherein the frame is rectangular with at least 10 rollers in parallel relationship attached thereto, said rollers having a gap of in the range of four inches between adjacent rollers.

5. The table of claim 1 wherein the plastic pipe section is a section of plastic drain pipe.

6. For use in combination with a power tool with which large workpieces are used, a self-supporting roller table comprising:

a frame including a pair of elongated side members and a pair of end members secured to the side members to hold the side members in assembly said side members having substantially straight lower edges;

a plurality of support legs comprising a leg adjacent each junction of the side and end members for supporting said frame independently of the power tool at a height compatible for cooperation with a power tool;

hinge means for pivotally mounting each leg to a frame side member adjacent the lower edge of the respective side member and in vertical alignment with the side member, the hinge means comprise a pair of ears extending laterally of the legs and spaced apart to receive the respective side frame member and pivotally mounted with a pin passing through the ears and the respective side frame member to form the pivot axis of the respective hinge means, said pivot axis being offset from the longitudinal axis of the respective leg and positioned above the upper end of the respective leg so that when the legs are pivoted upright the upper ends of the legs abut against the lower edge of the respective side frame member to directly support the frame and so the legs may be folded to be parallel to the lower edge and in a position to rest substantially against the lower edge of the respective side member;

means to connect the two legs at each end of the frame together to form a leg unit, brace means for each leg unit in its upright position extending from the leg unit to the frame side members, said brace means comprising a pair of rods at each leg unit, each rod having a main portion and an end ear portion bent at right angles to the main portion, and a pair of separate apertures on the interior surface of each frame side member of size to removably retain the end portions of the rods of the respective leg units at the opposite ends of the frame when the legs are in upright position;

a plurality of rollers, each roller comprising a conventional plastic pipe section having two open ends and a pair of plastic end plugs having surfaces for concentrically engaging an inside surface of the plastic pipe at both open ends; and means for rotatably mounting the rollers between the side frame members in substantially parallel relationship to each other comprising stub shafts integrally molded to the respective end caps and rotatably mounted directly in an aperture found in the adjacent frame side member.

* * * * *